(12) United States Patent
Sawada et al.

(10) Patent No.: US 11,303,002 B2
(45) Date of Patent: Apr. 12, 2022

(54) SECONDARY BATTERY (71) Applicant: Vehicle Energy Japan Inc., Hitachinaka (JP)

(72) Inventors: Keisuke Sawada, Hitachinaka (JP); Kazuaki Urano, Hitachinaka (JP); Takuro Tsunaki, Hitachinaka (JP)

(73) Assignee: Vehicle Energy Japan Inc., Hitachinaka (JP)

( * ) Notice: Subject to any disclaimer, the term of this patent is extended or adjusted under 35 U.S.C. 154(b) by 253 days.

(21) Appl. No.: 15/120,589

(22) PCT Filed: Mar. 13, 2015

(86) PCT No.: PCT/JP2015/057427
§ 371 (c)(1),
(2) Date: Aug. 22, 2016

(87) PCT Pub. No.: WO2015/141570
PCT Pub. Date: Sep. 24, 2015

(65) Prior Publication Data
US 2017/0018758 A1    Jan. 19, 2017

(30) Foreign Application Priority Data

Mar. 18, 2014  (JP) .............................. JP2014-055154

(51) Int. Cl.
*H01M 50/578* (2021.01)
*H01M 50/543* (2021.01)
(Continued)

(52) U.S. Cl.
CPC ..... *H01M 50/578* (2021.01); *H01M 10/0431* (2013.01); *H01M 50/172* (2021.01);
(Continued)

(58) Field of Classification Search
CPC .. H01M 10/0431; H01M 2/263; H01M 2/348; H01M 2/305; H01M 2/06;
(Continued)

(56) References Cited

U.S. PATENT DOCUMENTS

2005/0118495 A1\* 6/2005 Kim .................... H01M 2/0413
429/56
2008/0038628 A1  2/2008 Yamauchi et al.
(Continued)

FOREIGN PATENT DOCUMENTS

EP    2 924 761 A1    9/2015
EP    3 089 239 A1    11/2016
(Continued)

OTHER PUBLICATIONS

Extended European Search Report issued in counterpart European Patent Application No. 15765116.7 dated Oct. 10, 2017 (Seven (7) pages).

(Continued)

*Primary Examiner* — Eugenia Wang
(74) *Attorney, Agent, or Firm* — Crowell & Moring LLP (57) ABSTRACT

Provided is a secondary battery which is capable of more reliably cutting off current by increasing a deformation amount of a member, which is deformed by a rise of an internal pressure of a battery container and cuts off current. The secondary battery is provided with a current cut-off mechanism in a current path between an external terminal and an electrode inside a battery container. The current cut-off mechanism is accommodated in the battery container, and is provided with a diaphragm connected to the external terminal and a current collector connected to the electrode. The diaphragm is disposed on an outer side of the battery container than the current collector and has a convex shape toward an inside of the battery container. The current
(Continued)

collector includes a concave portion on a surface facing the outer side of the battery container, and the diaphragm is bonded to the concave portion.

11 Claims, 7 Drawing Sheets

(51) Int. Cl.
*H01M 10/04* (2006.01)
*H01M 50/172* (2021.01)
*H01M 50/538* (2021.01)
*H01M 50/581* (2021.01)

(52) U.S. Cl.
CPC ....... *H01M 50/538* (2021.01); *H01M 50/543* (2021.01); *H01M 50/581* (2021.01); *H01M 2200/20* (2013.01)

(58) Field of Classification Search
CPC ............. H01M 2220/20; H01M 2/345; H01M 50/578; H01M 50/172; H01M 50/538; H01M 50/543; H01M 50/581; H01M 50/174; H01M 50/176; H01M 50/178; H01M 50/179; H01M 50/181; H01M 50/533; H01M 50/534; H01M 50/536; H01M 50/547; H01M 50/548; H01M 50/55; H01M 50/552; H01M 50/553; H01M 50/559; H01M 50/562; H01M 50/564; H01M 50/566; H01M 50/567; H01M 50/569; H01M 50/296
See application file for complete search history.

(56) References Cited

U.S. PATENT DOCUMENTS

| | | | |
|---|---|---|---|
| 2008/0182159 A1* | 7/2008 | Mitani | H01M 2/0413 429/56 |
| 2010/0167107 A1* | 7/2010 | Byun | H01M 2/1229 429/56 |
| 2013/0095352 A1 | 4/2013 | Yamauchi et al. | |
| 2015/0171411 A1 | 6/2015 | Kobayashi et al. | |
| 2015/0295221 A1* | 10/2015 | Urano | H01M 2/22 429/61 |
| 2016/0072119 A1 | 3/2016 | Umeyama et al. | |

FOREIGN PATENT DOCUMENTS

| | | |
|---|---|---|
| JP | 2008-66255 A | 3/2008 |
| JP | 2013-161712 A | 8/2013 |
| WO | WO 2013/164897 A1 | 11/2013 |
| WO | WO 2013/175619 A1 | 11/2013 |
| WO | WO 2014/033806 A1 | 3/2014 |
| WO | WO-2014080518 A1 * | 5/2014 ............ H01M 2/263 |

OTHER PUBLICATIONS

International Search Report (PCT/ISA/210) issued in PCT Application No. PCT/JP2015/057427 dated Apr. 7, 2015 with English translation (5 pages).
Japanese-language Written Opinion (PCT/ISA/237) issued in PCT Application No. PCT/JP2015/057427 dated Apr. 7, 2015 (3 pages).

* cited by examiner

SECONDARY BATTERY

TECHNICAL FIELD

The present invention relates to a secondary battery provided with a current cut-off mechanism which cuts off a current path between an external terminal and an electrode inside a battery container.

BACKGROUND ART

Conventionally, secondary batteries have been widely used as power sources of vehicle motors or other electronics, for example. It is necessary to enhance safety by cutting off current in the secondary battery, for example, in a case in which a gas pressure inside the battery rises due to a breakage or the like caused by overcharge, an excessive temperature rise or an external force. A non-aqueous electrolyte secondary battery provided with a pressure-sensitive elastic element has been known as the secondary battery (for example, see PTL 1 to be described later).

The non-aqueous electrolyte secondary battery described in PTL 1 is provided with the pressure-sensitive elastic element, which deforms in accordance with an increase in a gas pressure inside the battery, halfway in an electric conduction path, which electrically connects an external electrode terminal and an electrode assembly. The external electrode terminal includes a continuous hole, which connects an outside of the battery and a space in contact with an outer side of the battery of the pressure-sensitive elastic element, therein.

The pressure-sensitive elastic element deforms in accordance with the increase in the gas pressure inside the battery, and cuts off the electrical connection between the external electrode terminal and the electrode assembly. In PTL 1, the pressure-sensitive elastic element reliably and speedily operates, and it is possible to realize the non-aqueous electrolyte secondary battery provided with the pressure-sensitive elastic element which is capable of preventing time degradation due to moisture or the like entering from the outside of the battery, and is excellent in reliability.

CITATION LIST

Patent Literature

PTL 1: JP 2008-66255 A

SUMMARY OF INVENTION

Technical Problem

The pressure-sensitive elastic element is configured of a diaphragm having a flat plate shape and an interrupting foil in the non-aqueous electrolyte secondary battery described in PTL 1. Thus, it is difficult to increase a deformation amount of the diaphragm at the time of deforming the diaphragm using the gas pressure inside the battery and breaking the interrupting foil, and a state is formed in which the deformed diaphragm and the remaining interrupting foil, a current collector, and the like are close to each other in some cases. In this case, there is a risk that the deformed diaphragm, the remaining interrupting foil, the current collector, and the like are conducted via, for example, an electrolytic solution, and it is difficult to reliably cut off a current path between an electrode and an external terminal.

The present invention has been made in view of the above-described problem, and an object thereof is to provide a secondary battery which is capable of reliably performing cut-off of a current path by increasing a deformation amount of a diaphragm, which is deformed by a rise of an internal pressure of a battery container and cuts off the current path between an electrode and an external terminal.

Solution to Problem

In order to achieve the above-described object, a secondary battery of the present invention is the secondary battery including a current cut-off mechanism provided in a current path between an external terminal and an electrode inside a battery container, in which the current cut-off mechanism is accommodated in the battery container, and includes a diaphragm connected to the external terminal and a current collector connected to the electrode, the current collector includes a concave portion on a surface opposing the diaphragm, the diaphragm includes a bottom wall portion of which a center portion bulges than a circumferential portion toward the current collector and a protruding portion which protrudes from the bottom wall portion, at least a part of the bottom wall portion is accommodated in the concave portion, and the protruding portion is bonded to the current collector inside the concave portion.

Advantageous Effects of Invention

The diaphragm, which is deformed and cuts off current when an internal pressure of the battery container rises, includes the bottom wall portion of which the center portion bulges than the circumferential portion toward the current collector and the protruding portion which protrudes from the bottom wall portion, at least the part of the bottom wall portion is accommodated in the concave portion, and the protruding portion is bonded to the current collector inside the concave portion in the secondary battery of the present invention. Accordingly, it is possible to realize reduction in size of the current cut-off mechanism inside the battery container, and to increase a protrusion amount of the diaphragm toward an inside of the battery container.

Accordingly, it is possible to suppress an increase in size of a current cut-off mechanism, to increase a deformation amount of the diaphragm when the internal pressure of the battery container rises, to enlarge an interval between the deformed diaphragm and the current collector, and to more reliably perform the cut-off of the current path between the electrode and the external terminal according to the secondary battery of the present invention.

DESCRIPTION OF EMBODIMENTS

Hereinafter, an embodiment of a secondary battery of the present invention will be described with reference to the drawings.

Figure 1:
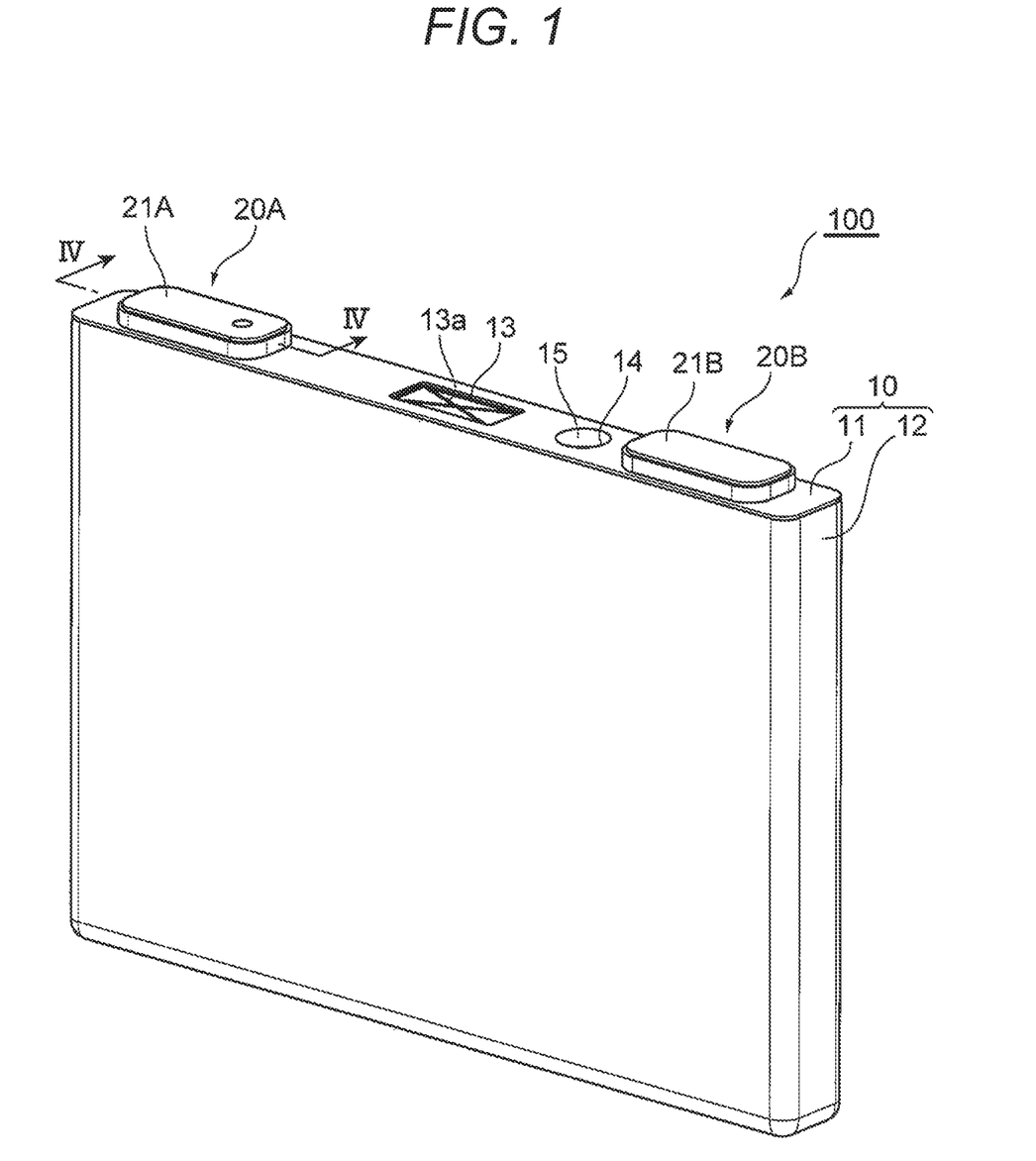
FIG. 1 is a perspective view illustrating an appearance of a secondary battery according to an embodiment of the present invention.

FIG. 1 is a perspective view of a secondary battery 100 of the embodiment.

The secondary battery 100 of the embodiment is, for example, a prismatic secondary battery provided with a battery container 10 having a flat box shape which is configured of a battery cover 11 having a rectangular plate shape and a battery case 12 having a bottomed prismatic shape. The battery container 10 is manufactured by a metal material, for example, an aluminum alloy or the like.

External terminals 20A and 20B of a positive electrode and a negative electrode are provided on both ends in a width direction of the battery container 10, that is, in a long-side direction of the battery cover 11 on an upper surface of the battery cover 11 at an outer portion of the battery container 10. An insulating member 2 is disposed between each of the external terminals 20A and 20B and the battery cover 11, and the external terminals 20A and 20B are electrically insulated from the battery cover 11. The external terminal 20A of the positive electrode is made of, for example, aluminum or an aluminum alloy, and the external terminal 20B of the negative electrode is made of, for example, copper or a copper alloy.

A gas discharge valve 13 and a liquid injecting port 14 are provided between the external terminals 20A and 20B of the positive electrode and the negative electrode of the battery cover 11. The gas discharge valve 13 is provided by, for example, thinning the battery cover 11 and forming a groove portion 13a, and drops a pressure inside the battery container 10 by being cleaved to release an internal gas when the pressure inside the battery container 10 rises exceeding a predetermined value. The liquid injecting port 14 is used to inject an electrolytic solution inside the battery container 10, and is welded and sealed with a liquid injecting plug 15 by, for example, a laser welding.

Figure 2:
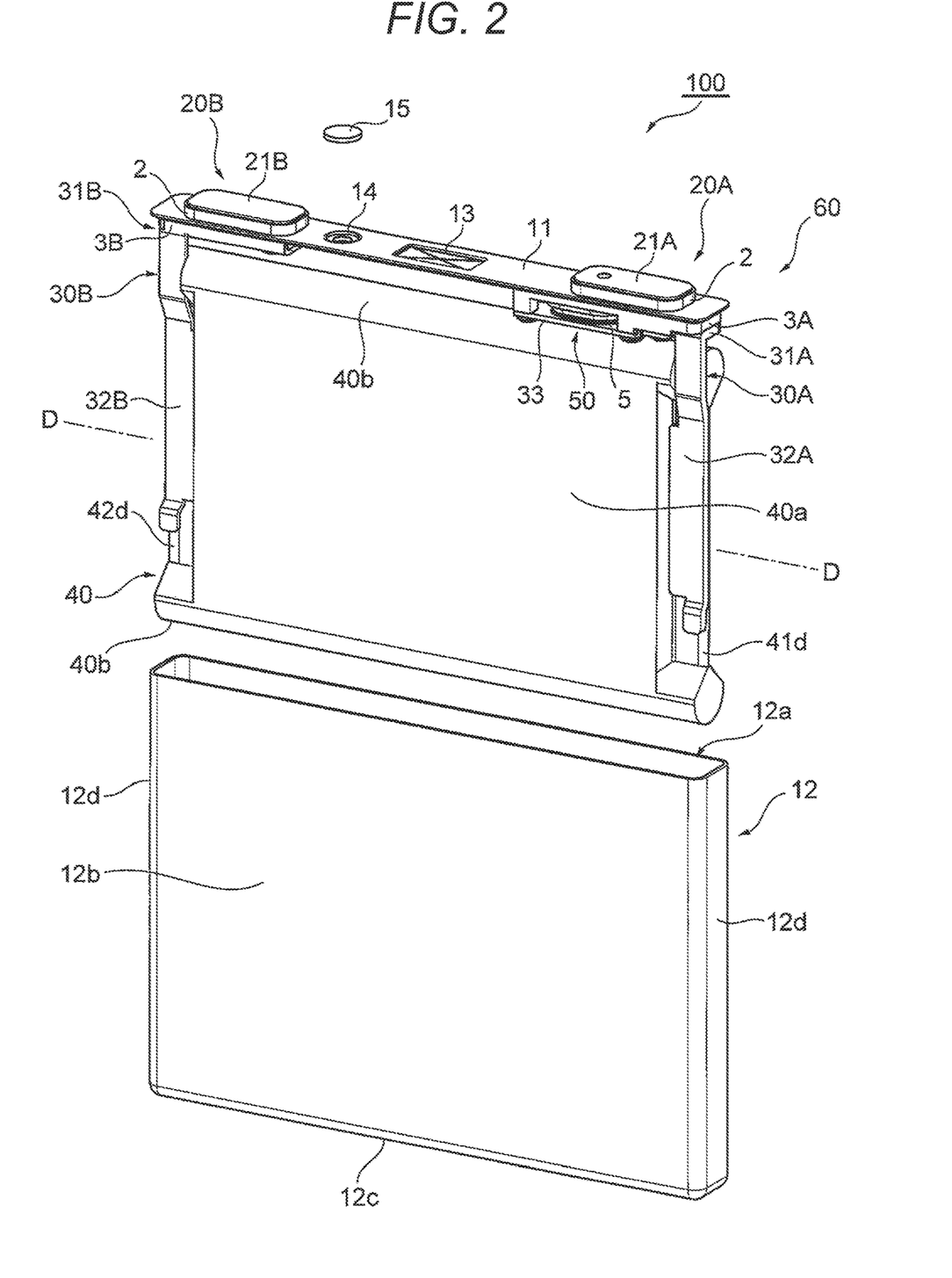
FIG. 2 is an exploded perspective view of the secondary battery illustrated in FIG. 1.

FIG. 2 is an exploded perspective view of the secondary battery 100 illustrated in FIG. 1.

Current collectors 30A and 30B of the positive electrode and the negative electrode are fixed, via insulating members 3A and 3B, to a lower surface of the battery cover 11, which serves as an inside of the battery container 10, at both the ends of the battery cover 11 in the long-side direction. The current collectors 30A and 30B include base portions 31A and 31B, which are provided to be substantially parallel to the lower surface of the battery cover 11 and fixed to the insulating members 3A and 3B, and connection terminal portions 32A and 32B which extend from the base portions 31A and 31B toward a bottom surface 12c of the battery case 12.

The current collector 30A of the positive electrode includes a breaking unit 33 which is connected to the base portion 31A. The breaking unit 33 is a plate-shaped portion which is provided to be substantially parallel to the battery cover 11, and is fixed to the battery cover 11 via the insulating member 3A. A diaphragm 5 is disposed between the breaking unit 33 and the external terminal 20A of the positive electrode to be connected thereto. The breaking unit 33 and the diaphragm 5 form a current cut-off mechanism 50 of the secondary battery 100. That is, the current cut-off mechanism 50 is accommodated in the battery container 10, is configured of the diaphragm 5 connected to the external terminal 20A and the current collector 30A connected to a positive electrode 41 of an electrode group 40 (see FIG. 3), and is provided in a current path between the external terminal 20A and the positive electrode 41. The current cut-off mechanism 50 cuts off the current path between the external terminal 20A and the positive electrode 41 when the pressure inside the battery container 10 rises exceeding a predetermined pressure although details thereof will be described later.

The connection terminal portions 32A and 32B of the current collectors 30A and 30B of the positive electrode and the negative electrode are formed to have a plate shape which extends from one side of the base portions 31A and 31B in a thickness direction of the battery container 10 toward the bottom surface 12c of the battery case 12 along a wide side surface 12b which is the largest area of the battery case 12. The connection terminal portions 32A and 32B are bent in the thickness direction of the battery container 10 halfway in the extending direction, and are bonded to current collector bonding portions 41d and 42d, respectively, of the electrode group 40 by, for example, an ultrasonic welding. Accordingly, the external terminals 20A and 20B are electrically connected to the current collector bonding portions 41d and 42d of the electrode group 40 via the current collectors 30A and 30B, and whereby, a cover assembly 60 is configured in which the external terminals 20A and 20B, the insulating member 2, the insulating members 3A and 3B, the current collectors 30A and 30B, the current cut-off mechanism 50, and the electrode group 40 are assembled with the battery cover 11.

The cover assembly 60 is inserted from a curved portion 40b on a lower side of the electrode group 40 into an opening portion 12a of the battery case 12 in an electrically insulated state of the electrode group 40 and the battery case 12 by disposing an insulating sheet (not illustrated) therebetween at the time of manufacturing the secondary battery 100. The electrode group 40 is accommodated in the battery case 12 such that narrow side surfaces 12d and 12d of the battery case 12 are positioned at both sides in a direction of a winding axis D, and the winding axis D direction is substantially parallel to the bottom surface 12c and the wide side surface 12b of the battery case 12. Accordingly, the electrode group 40 is in a state in which one of the curved portions 40b opposes the battery cover 11, the other curved portion 40b opposes the bottom surface 12c of the battery case 12, and planar portions 40a oppose the wide side surface 12b. Further, the entire circumference of the battery cover 11 is bonded to the opening portion 12a of the battery case 12 by, for example, a laser welding in a state in which the opening portion 12a of the battery case 12 is occluded by the battery cover 11, thereby forming the battery container 10 configured of the battery cover 11 and the battery case 12.

Thereafter, a non-aqueous electrolytic solution is injected inside the battery container 10 through the liquid injecting port 14 of the battery cover 11, and the liquid injecting port 14 is bonded and sealed with the liquid injecting plug 15 by, for example, a laser welding, thereby hermetically sealing the battery container 10. It is possible to use a solution obtained by dissolving lithium hexafluorophosphate ($LiPF_6$), at a concentration of 1 mol/liter, in a mixed solution in which ethylene carbonate and dimethyl carbonate are mixed at a volume ratio of 1:2, for example, as the non-aqueous electrolytic solution to be injected inside the battery container 10.

Figure 3:
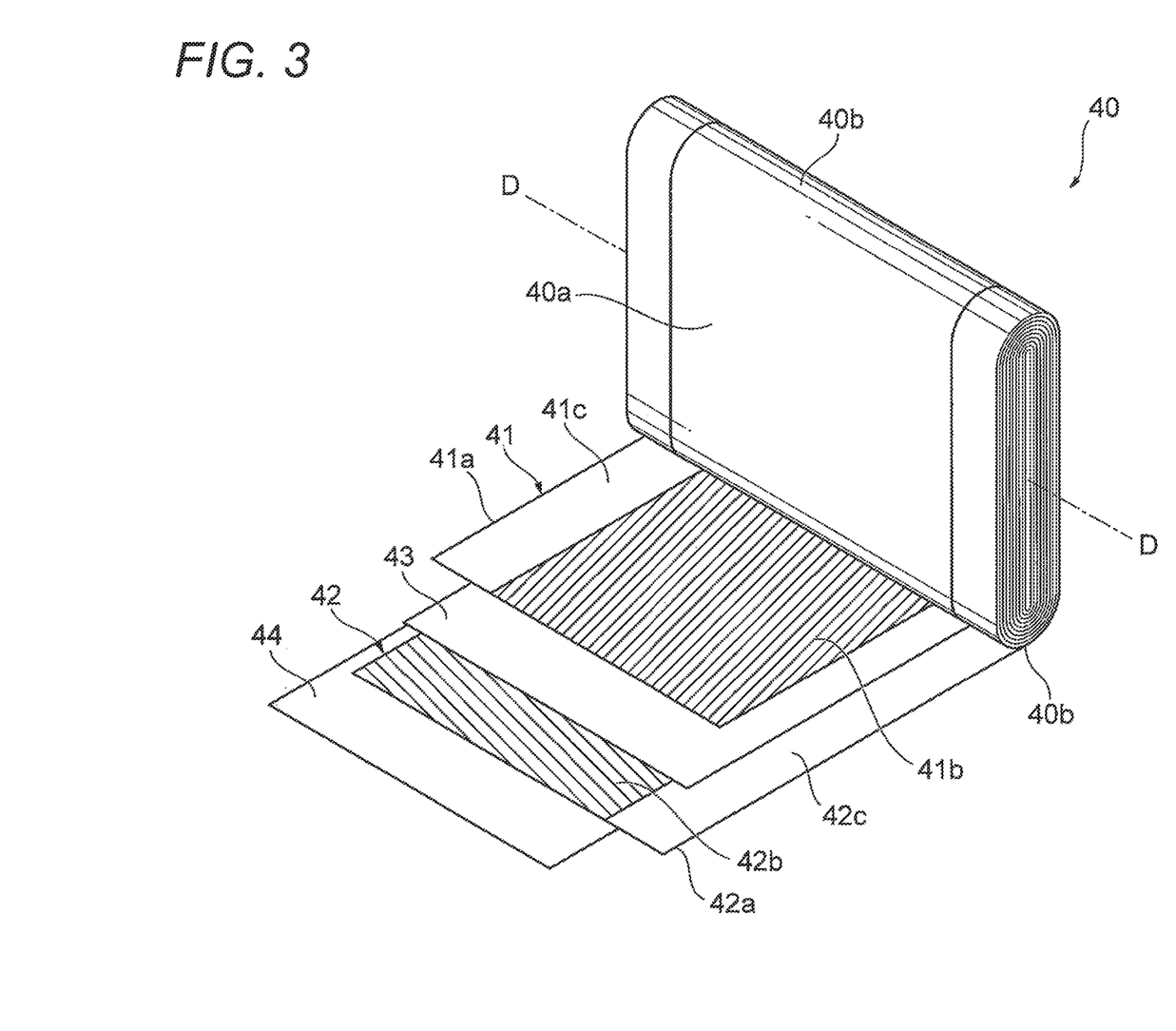
FIG. 3 is an exploded perspective view of an electrode group of the secondary battery illustrated in FIG. 1.

FIG. 3 is an exploded perspective view obtained by developing a part of the electrode group 40 illustrated in FIG. 2.

The electrode group 40 is a group of wound electrodes in which the positive and negative electrodes 41 and 42, which are laminated with separators 43 and 44 interposed therebetween, are wound around a shaft center which is parallel to the winding axis D and are molded in a flat shape. The electrode group 40 includes the pair of flat planar portions 40a disposed to oppose the wide side surface 12b of the battery case 12 and the pair of curved portions 40b which have a semi-cylindrical shape and are disposed to oppose the battery cover 11 and the bottom surface 12c of the battery case 12. The separators 43 and 44 insulate the positive electrode 41 from the negative electrode 42, and the separator 44 is wound also around an outside of the negative electrode 42 which is wound around the outermost circumference.

The positive electrode 41 includes a positive electrode foil 41a serving as a positive electrode current collector and a positive electrode mixture layer 41b which is made of a positive-electrode active material mixture applied to both surfaces of the positive electrode foil 41a. One side of the positive electrode 41 in the width direction on which the positive electrode mixture layer 41b is not formed serves as an exposed foil portion 41c in which the positive electrode foil 41a is exposed. The positive electrode 41 is wound around the winding axis D such that the exposed foil portion 41c is disposed on the opposite side of an exposed foil portion 42c of the negative electrode 42 in the winding axis D direction.

It is possible to manufacture the positive electrode 41 by, for example, applying the positive-electrode active material mixture, in which a positive-electrode active material is added and kneaded with a conductive material, a binding agent, and a dispersion solvent, on both the surfaces of the positive electrode foil 41a except for the one side thereof in the width direction, and drying, pressing, and cutting the resultant. It is possible to use an aluminum foil having a thickness of about 20 μm, for example, as the positive electrode foil 41a. A thickness of the positive electrode mixture layer 41b excluding the thickness of the positive electrode foil 41a is about, for example, 90 μm.

For example, it is possible to use 100 parts by weight of lithium-manganese oxide (chemical formula: $LiMn_2O_4$) as the positive-electrode active material, 10 parts by weight of scale-like graphite as the conductive material, 10 parts by weight of polyvinylidene fluoride (hereinafter, referred to as PVDF) as the binding agent, and N-methylpyrrolidone (hereinafter, referred to as NMP) as the dispersion solvent, as materials of the positive-electrode active material mixture. The positive-electrode active material is not limited to the above-described lithium-manganese oxide, and for example, another lithium-manganese oxide having a spinel crystal structure or a lithium-manganese composite oxide partially substituted by or doped with a metal element may be used. In addition, lithium cobalt oxide or lithium titanate having a layered crystal structure, and a lithium-metal composite oxide obtained by substituting a part of the both by, or doping a part thereof with, a metal element, may be used as the positive-electrode active material.

The negative electrode 42 includes a negative electrode foil 42a serving as a negative electrode current collector and a negative electrode mixture layer 42b which is made of a negative-electrode active material mixture applied to both surfaces of the negative electrode foil 42a. One side of the negative electrode 42 in the width direction on which the negative electrode mixture layer 42b is not formed serves as the exposed foil portion 42c in which the negative electrode foil 42a is exposed. The negative electrode 42 is wound around the winding axis D such that the exposed foil portion 42c is disposed on the opposite side of the exposed foil portion 41c of the positive electrode 41 in the winding axis D direction.

It is possible to manufacture the negative electrode 42 by, for example, applying the negative-electrode active material mixture, in which a negative-electrode active material is added and kneaded with a binding agent and a dispersion solvent, on both the surfaces of the negative electrode foil 42a except for the one side thereof in the width direction, and drying, pressing, and cutting the resultant. It is possible to use a copper foil having a thickness of about 10 μm, for example, as the negative electrode foil 42a. A thickness of the negative electrode mixture layer 42b excluding the thickness of the negative electrode foil 42a is about, for example, 70 μm.

For example, it is possible to use 100 parts by weight of amorphous carbon powder as the negative-electrode active material, 10 parts by weight of PVDF as the binding agent, and NMP as the dispersion solvent as materials of the negative-electrode active material mixture. The negative-electrode active material is not limited to the above-described amorphous carbon, and natural graphite into or from which lithium ions can be inserted or desorbed, various artificial graphite materials, a compound of carbonaceous materials such as coke, Si, Sn and the like (for example, SiO, $TiSi_2$ or the like), or a composite material thereof may be used. A particle shape of the negative-electrode active material is not particularly limited, and scaly, globular, fibrous, or any other equivalent particle shape can be appropriately selected.

Incidentally, the binding materials to be used in the positive electrode and the negative electrode mixture layers 41b and 42b described above are not limited to PVDF. For example, a polymer such as polytetrafluoroethylene (PTFE), polyethylene, polystyrene, polybutadiene, butyl rubber, nitrile rubber, styrene butadiene rubber, polysulfide rubber, nitrocellulose, cyanoethyl cellulose, various types of latex, acrylonitrile, vinyl fluoride, vinylidene fluoride, propylene fluoride, chloroprene fluoride, and acrylic resin, and a mixture thereof may be used as the above-described binding materials.

In addition, it is possible to use a wound resin sheet, for example, which has a higher bending rigidity than any of the positive electrode foil 41a, the negative electrode foil 42a, and the separators 43 and 44 as an axial core at the time of winding the positive electrode 41 and the negative electrode 42 together with the separators 43 and 44 interposed therebetween.

A width of the negative electrode mixture layer 42b of the negative electrode 42 in the winding axis D direction of the electrode group 40 is set to be wider than a width of the positive electrode mixture layer 41b of the positive electrode 41. In addition, the negative electrode 42 is wound around the innermost circumference and the outermost circumference of the electrode group 40. Accordingly, the positive electrode mixture layer 41b is interposed between the negative electrode mixture layers 42b from the innermost circumference to the outermost circumference of the electrode group 40.

The exposed foil portions 41c and 42c of the positive electrode 41 and the negative electrode 42 are bundled, respectively, on the planar portions 40a of the electrode group 40, thereby forming the above-described current collector bonding portions 41d and 42d (see FIG. 2). The respective current collector bonding portions 41d and 42d of the positive electrode 41 and the negative electrode 42 are bonded to the respective connection terminal portions 32A and 32B of the current collectors 30A and 30B of the positive electrode and the negative electrode by, for example, an ultrasonic welding or the like. Accordingly, the external terminals 20A and 20B are electrically connected to the positive and negative electrodes 41 and 42, which form the electrode group 40, via the current collectors 30A and 30B, respectively, on the positive-electrode side and the negative-electrode side.

Incidentally, each width of the separators 43 and 44 is wider than the width of the negative electrode mixture layer 42b in the winding axis D direction of the electrode group 40, and the exposed foil portions 41c and 42c of the positive electrode 41 and the negative electrode 42 protrude outwardly in the width direction than each end portion of the separators 43 and 44 in the width direction. Accordingly, the separators 43 and 44 do not become a hindrance at the time of bundling and welding each of the exposed foil portions 41c and 42c.

Figure 4:
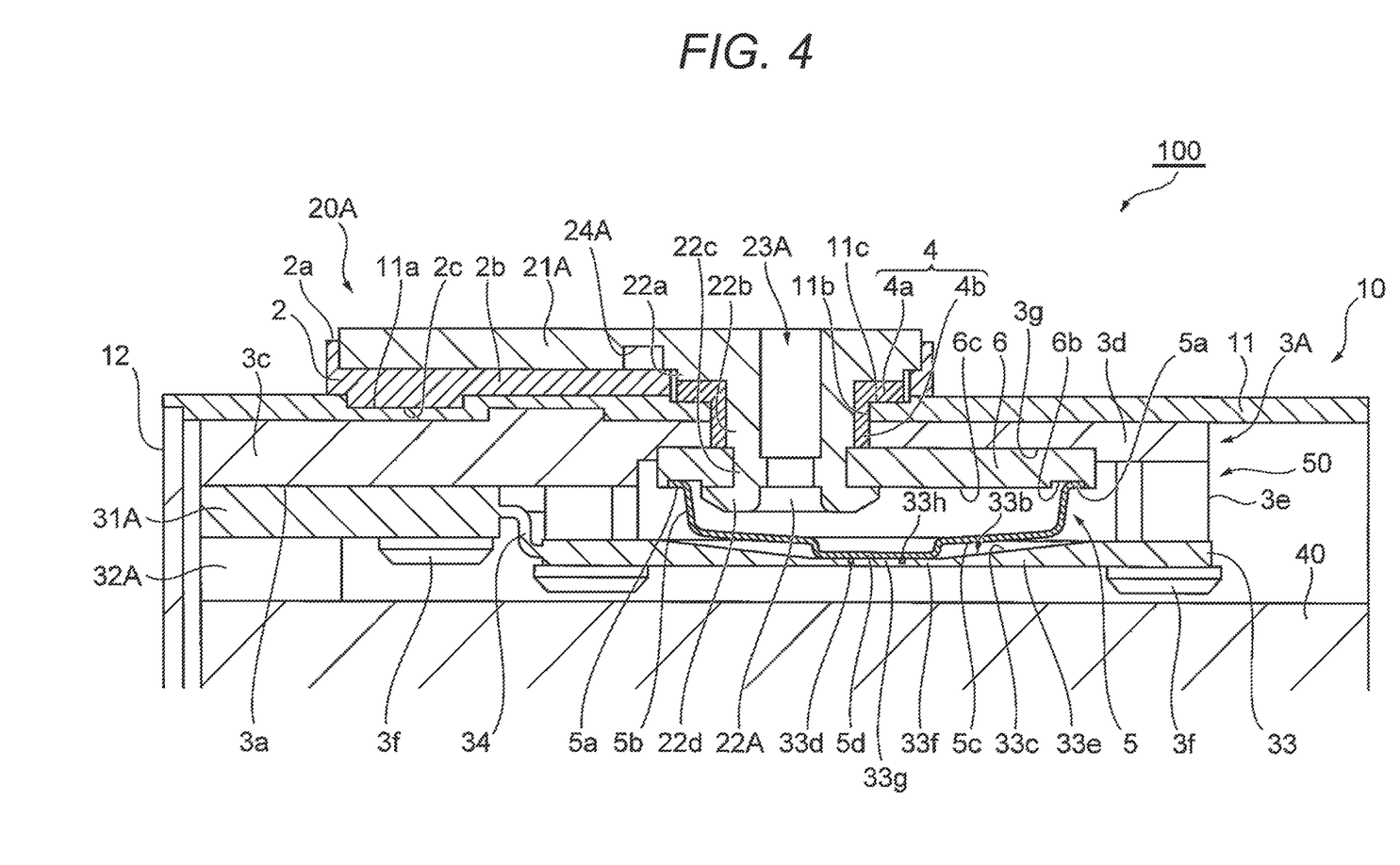
FIG. 4 is an enlarged cross-sectional view around a current cut-off mechanism of the secondary battery illustrated in FIG. 1.
Figure 5:
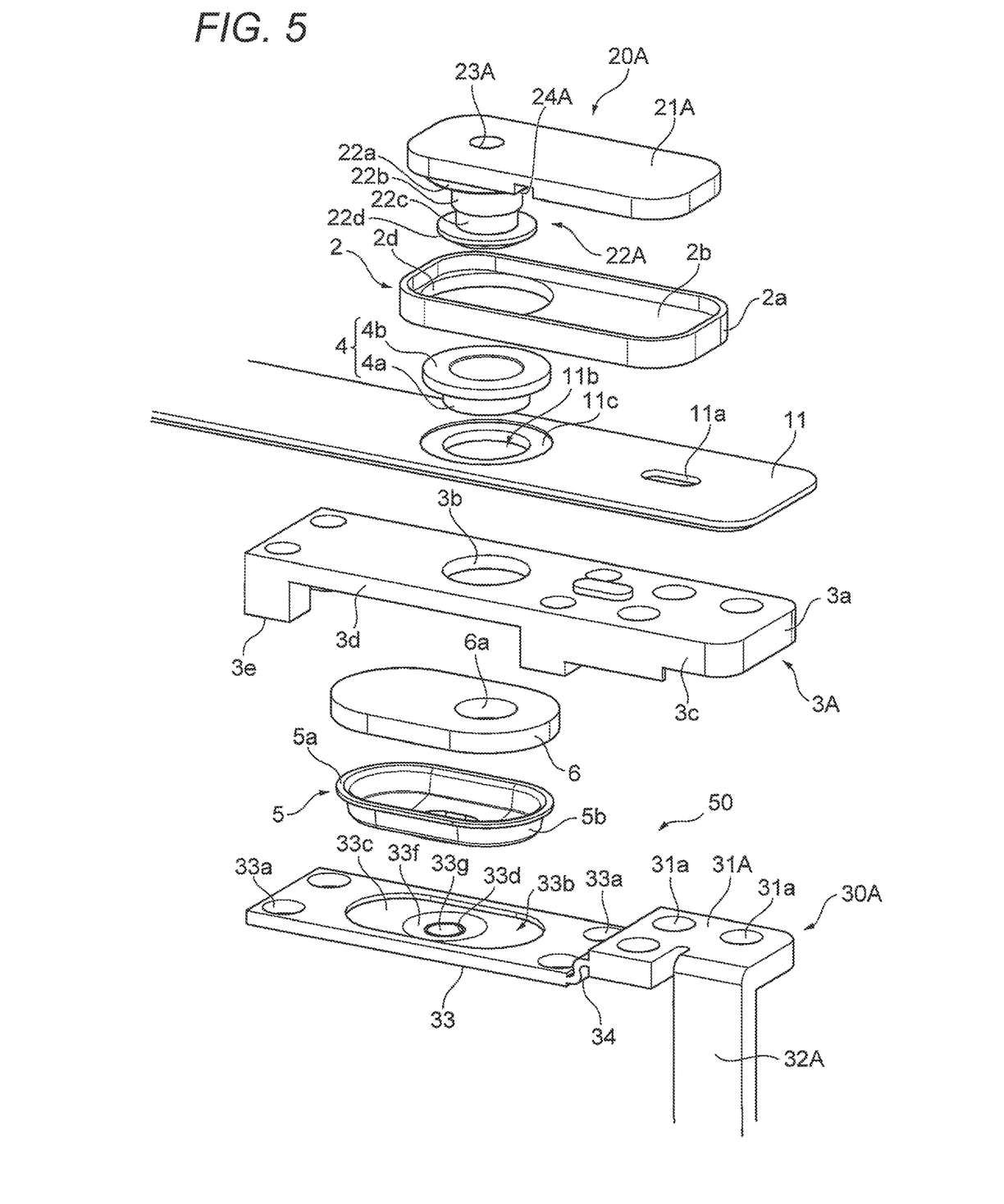
FIG. 5 is an exploded perspective view around the current cut-off mechanism of the secondary battery illustrated in FIG. 1.

FIG. 4 is an enlarged cross-sectional view in the vicinity of the external terminal 20A taken along a line IV-IV of the secondary battery 100 illustrated in FIG. 1. FIG. 5 is an exploded perspective view of the respective members illustrated in FIG. 4. Incidentally, FIG. 5 does not illustrate the electrode group 40.

The current cut-off mechanism 50 accommodated in the battery container 10 includes the diaphragm 5 electrically connected to the external terminal 20A and the breaking unit 33 of the current collector 30A connected to the positive electrode 41 of the electrode group 40, as constituent elements, and forms a part of the current path between the external terminal 20A and the electrode group 40 inside the battery container 10.

The external terminal 20A is fixed to the upper surface of the battery cover 11 at an outside of the battery container 10 via the insulating member 2 on the outside of the battery container 10 and a gasket 4. The diaphragm 5 is fixed to the lower surface of the battery cover 11 at the inside of the battery container 10 via the insulating member 3A and the conductive plate 6. The current collector 30A has the base portion 31A and the breaking unit 33 being fixed to the lower surface of the battery cover 11 via the insulating member 3A. The diaphragm 5 and the conductive plate 6 are disposed between the breaking unit 33 of the current collector 30A and the insulating member 3A.

The external terminal 20A includes a plate-shaped portion 21A, which extends in the width direction of the battery container 10, that is, the long-side direction of the battery cover 11, a connection portion 22A, which has a cylindrical shape and is provided at an end portion of the plate-shaped portion 21A inwardly in the width direction of the battery container 10, and a through-hole 23A which passes through the plate-shaped portion 21A and the connection portion 22A. The plate-shaped portion 21A of the external terminal 20A has a thickness which is set to be partially thin as a groove portion 24A is formed at a center portion in the extending direction along a direction intersecting the extending direction, for example, along the thickness direction of the battery container 10.

From the plate-shaped portion 21A toward a distal end in the axial direction passing through the battery cover 11, the connection portion 22A of the external terminal 20A includes a stepped portion 22a, which is provided on a bottom surface of the plate-shaped portion 21A in a stepwise manner, an enlarged diameter portion 22b of which the diameter is enlarged, a reduced diameter portion 22c of which the diameter is reduced, and a caulking portion 22d which is enlarged in diameter by plastically deforming a distal end of the reduced diameter portion 22c. The through-hole 23A of the external terminal 20A passes through the external terminal 20A along an axial direction of the connection portion 22A, and is opened to an upper surface of the plate-shaped portion 21A and a center portion of the caulking portion.

The insulating member 2 on the outside of the battery container 10 is manufactured using, for example, a resin material having an insulating property, and includes an edge portion 2a which covers a circumferential side surface of the plate-shaped portion 21A of the external terminal 20A and a bottom portion 2b which is in close contact with the bottom surface of the plate-shaped portion 21A and the upper surface of the battery cover 11. The edge portion 2a of the insulating member 2 covers the circumferential side surface of the plate-shaped portion 21A, thereby preventing short-circuit between the plate-shaped portion 21A and the battery cover 11 or other members. The bottom portion 2b of the insulating member 2 electrically insulates the plate-shaped portion 21A of the external terminal 20A from the battery cover 11 by being disposed therebetween. A convex portion 2c, which is engaged with the concave portion 11a provided on the upper surface of the battery cover 11, and an opening portion 2d into which the connection portion 22A of the external terminal 20A is inserted are provided on the bottom portion 2b of the insulating member 2.

The gasket 4 is manufactured using, for example, a resin material having an insulating property, and includes a cylindrical portion 4a, which has a cylindrical shape, and a flange portion 4b which is provided at an end portion on an outer side of the battery container 10 in an axial direction of the cylindrical portion 4a. The cylindrical portion 4a of the gasket 4 is inserted into the through-hole 11b of the battery cover 11 in a state in which the connection portion 22A of the external terminal 20A is inserted in an inside thereof, is disposed between the connection portion 22A of the external terminal 20A and an inner circumferential surface of the through-hole 11b of the battery cover 11, and electrically insulates the connection portion 22A from the battery cover 11. The flange portion 4b of the gasket 4 is disposed in the opening portion 2d of the insulating member 2, is engaged with a concave-shaped stepped portion 11c provided around the through-hole 11b of the battery cover 11, and is compressed between the stepped portion 11c and the convex-shaped stepped portion 22a of the external terminal 20A. Accordingly, the gasket 4 is in close contact with the concave-shaped stepped portion 11c and the convex-shaped stepped portion 22a, and seals the through-hole 11b of the battery cover 11.

The insulating member 3A on the inside of the battery container 10 is manufactured using, for example, a resin material having an insulating property, and includes a main body portion 3a, which extends in the width direction of the battery container 10, and a through-hole 3b which is provided at a center portion of the main body portion 3a in the extending direction. The main body portion 3a of the insulating member 3A includes a thick portion 3c which is disposed between the base portion 31A of the current collector 30A and the battery cover 11, a thin portion 3d to which the diaphragm 5 is fixed via the conductive plate 6, a support portion 3e which protrudes from the main body portion 3a toward the inside of the battery container 10 and supports the breaking unit 33 of the current collector 30A, and a protruding portion 3f which has a cylindrical shape and fixes the base portion 31A of the current collector 30A and the breaking unit 33. That is, the insulating member 3A has a thickness which is thinner in a portion between the conductive plate 6 and the battery cover 11 than a thickness of a portion between the base portion 31A of the current collector 30A and the battery cover 11.

A concave portion 3g with which the conductive plate 6 is engaged is provided in the thin portion 3d of the insulating member 3A. The concave portion 3g of the thin portion 3d is formed in a planar shape which corresponds to a planar shape of the conductive plate 6. A distal end of the protruding portion 3f of the insulating member 3A is melted and solidified to be enlarged in diameter in the state of passing through the through-holes 31a and 33a of the base portion 31A of the current collector 30A and the breaking unit 33. Accordingly, the protruding portion 3f of the insulating member 3A supports and causes the base portion 31A of the current collector 30A and the breaking unit 33 to be fixed to the thick portion 3c and the support portion 3e, respectively. Incidentally, the current collector 30A may be fixed to the insulating member 3A using a screw, a rivet, an adhesive or the like. Incidentally, the insulating member 3B on the negative-electrode side includes the main body portion 3a, the through-hole 3b, and the protruding portion 3f, which is similar to the insulating member 3A on the positive-electrode side, but is different from the insulating member 3A on the positive-electrode side in terms that the thick portion 3c, the thin portion 3d, and the support portion 3e are not included.

The conductive plate 6 is a plate-shaped member of which the planar shape is a field-track shape having a straight portion along the width direction of the battery container 10 and curved portions formed in an arc shape at both ends of the straight portion. Incidentally, the planar shape of the conductive plate 6 may be formed in an elliptical shape or an oblong shape having the width direction of the battery container 10 as a long-side direction thereof. The conductive plate 6 includes a through-hole 6a into which the connection portion 22A of the external terminal 20A is inserted and an annular groove 6b with which the circumferential portion 5a of the diaphragm 5 is engaged. The circumferential portion 5a of the diaphragm 5 is bonded to the annular groove 6b of the conductive plate 6 by, for example, a laser welding. The connection portion 22A of the external terminal 20A is inserted into the through-hole 6a in a state in which the conductive plate 6 is engaged with the concave portion 3g formed in the thin portion 3d of the insulating member 3A on the inside of the battery container 10. It is possible to manufacture the conductive plate 6 using the same material, for example, aluminum or an aluminum alloy, as the external terminal 20A of the positive electrode and the current collector 30A.

The connection portion 22A passing through the through-hole 6a of the conductive plate 6 has a distal end being enlarged in diameter on a surface 6c of the conductive plate 6 facing an inner side of the battery container 10, and the caulking portion 22d is formed at the distal end. Accordingly, the conductive plate 6 is fixed to the insulating member 3A and disposed between the external terminal 20A and the diaphragm 5, and electrically connects the external terminal 20A and the diaphragm 5. Incidentally, the surface 6c of the conductive plate 6 facing the inner side of the battery container 10 is preferably a flat surface without any rib or convex portion. It is because it is possible to prevent a rib or a convex portion from interfering the caulking portion 22d when the surface 6c of the conductive plate 6 facing the inner side of the battery container 10 is flat, and thus, it is possible to secure the diameter of the caulking portion 22d and to secure a strength of the fixation by caulking of the external terminal 20A using the connection portion 22A.

In this manner, the external terminal 20A, the insulating member 2 on the outside of the battery container 10, the gasket 4, and the insulating members 3A and 3B and the conductive plate 6 on the inside of the battery container 10 are integrally caulked and fixed to the battery cover 11. That is, when the plate-shaped portion 21A is disposed on the upper surface of the battery cover 11 on the outside of the battery container 10, and the connection portion 22A has the caulking portion 22d formed after passing through the opening portion 2d of the insulating member 2 on the outside of the battery container 10, the cylindrical portion 4a of the gasket 4, the through-hole 11b of the battery cover 11, the through-hole 3b of the insulating member 3A on the inside of the battery container 10, and the through-hole 6a of the conductive plate 6, these members are integrally fixed by the external terminal 20A. In addition, the external space of the battery container 10 and a space between the conductive plate 6 and the diaphragm 5 communicate with each other via the through-hole 23A provided in the connection portion 22A of the external terminal 20A which passes through the respective members. Incidentally, the external terminal 20B on the negative-electrode side has a caulking portion being formed after a connection portion, which is similar to the connection portion 22A of the external terminal 20A on the positive-electrode side, passes through a base portion 31B of a current collector 30B, but does not include a through-hole.

The diaphragm 5 has a convex shape in which a center portion bulges toward the current collector 30A than a circumferential portion. In addition, the diaphragm 5 has the convex shape which is disposed on an outer side of the battery container 10 than the breaking unit 33 of the current collector 30A and faces the inside of the battery container 10. The diaphragm 5 has a planar shape, which is formed in an elliptical shape, an oblong shape, or the above-described field-track shape having the width direction of the battery container 10 as a long-side direction thereof, corresponding to the planar shape of the conductive plate 6, and is formed in a bowl shape having a depth in a height direction of the battery container 10 perpendicular to the battery cover 11.

The diaphragm 5 sequentially includes the circumferential portion 5a, the side wall portion 5b, the bottom wall portion 5c, and the protruding portion 5d from the outer side to the inner side of the battery container 10 in a direction from the battery cover 11 toward a bottom surface of the battery case 12. It is possible to manufacture the diaphragm 5 using the same material, for example, aluminum or an aluminum alloy, as the external terminal 20A of the positive electrode and the current collector 30A.

The circumferential portion 5a of the diaphragm 5 is bent along a direction parallel to the battery cover 11, is engaged with the annular groove 6b formed on a surface of the conductive plate 6 facing the inner side of the battery container 10, abuts on the bottom portion of the annular groove 6b, and is bonded to the conductive plate 6 by, for example, a laser welding. Accordingly, a space of the diaphragm 5 on the outer side of the battery container 10 is isolated from an internal space of the battery container 10, and communicates with an external space of the battery container 10 via the through-hole 23A of the external terminal 20A. The side wall portion 5b of the diaphragm 5 elongates from the circumferential portion 5a toward the bottom surface 12c of the battery case 12 along a direction perpendicular to the battery cover 11, and has an angle with respect to the direction perpendicular to the battery cover 11 being set to smaller than an angle with respect to the direction parallel to the battery cover 11.

The bottom wall portion 5c of the diaphragm 5 extends from an end portion of the side wall portion 5b toward the center portion of the diaphragm 5 along the direction parallel to the battery cover 11, and has an angle with respect to the direction perpendicular to the battery cover 11 being set to be larger than an angle with respect to the direction parallel to the battery cover 11. In addition, a surface of the bottom wall portion 5c facing the inside of the battery container 10 is formed as a convexly curved surface. The protruding portion 5d of the diaphragm 5 is formed in a shape similar to the planar shape of the diaphragm 5 when seen in a plan view, and is formed to protrude toward the inner side of the battery container 10 at a center portion of the bottom wall portion 5c.

At least a part of the diaphragm 5 is accommodated in the concave portion 33b of the current collector 30A, and is bonded to the current collector 30A inside the concave portion 33b. To be more specific, the diaphragm 5 has the most part of the bottom wall portion 5c and the protruding portion 5d being accommodated in the concave portion 33b of the current collector 30A and the protruding portion 5d being bonded to a bottom portion of the concave portion 33b by, for example, a laser welding, a resistance welding or an ultrasonic welding inside the concave portion 33b of the current collector 30A in the embodiment.

As described above, the current collector 30A of the positive electrode includes the base portion 31A which is fixed to the insulating member 3A, the connection terminal portion 32A which is bonded to the current collector bonding portion 41d of the positive electrode of the electrode group 40, and the breaking unit 33 which is connected to the base portion 31A via a coupling portion 34. A plurality of through-holes 31a into which the protruding portions 3f of the insulating member 3A are inserted are provided in the base portion 31A of the current collector 30A. The current collector 30A has a shape in which the coupling portion 34 which connects the base portion 31A and the breaking unit 33 is curved in an S-shape, for example, and has flexibility, the breaking unit 33 is disposed on the inner side of the battery container 10 than the base portion 31A, and the breaking unit 33 is disposed at a position separated from the battery cover 11 farther than the base portion 31A. The concave portion 33b is formed on a surface of the breaking unit 33 of the current collector 30A toward the outer side of the battery container 10, and the protruding portion 5d of the diaphragm 5 is bonded inside the concave portion 33b.

The concave portion 33b provided in the breaking unit 33 of the current collector 30A includes an inclined surface 33c along the convex shape of the diaphragm 5 and a fragile portion 33d which is broken when the diaphragm 5 is deformed toward the outer side of the battery container 10. The concave portion 33b has a planar shape which is formed in an elliptical shape, an oblong shape, or the above-described field-track shape having the width direction of the battery container 10 as a long-side direction thereof, corresponding to the planar shape of the diaphragm 5 when seen in a plan view. A method of forming the concave portion 33b is not particularly limited, and can be formed by performing pressing for example, on the breaking unit 33 of the current collector 30A.

When the concave portion 33b provided in the breaking unit 33 of the current collector 30A includes the inclined surface 33c, a thickness of the bottom wall 33e gradually becomes thinner from a circumferential portion toward a center portion thereof, and a thin portion 33f is provided at the center portion surrounded by the inclined surface 33c. The thin portion 33f is formed in a circular shape when seen in a plan view, and the area thereof is in contact with the entire bottom surface of the protruding portion 5d of the diaphragm 5. The fragile portion 33d having an annular shape is provided in a center portion of the thin portion 33f, and a portion surrounded by the fragile portion 33d serves as a bonding portion 33g to be bonded to the diaphragm 5. The fragile portion 33d is provided using a notched portion 33h formed in the thin portion 33f of the concave portion 33b, and has a thinner thickness than the thin portion 33f. The bottom surface of the protruding portion 5d of the diaphragm 5 abuts on the thin portion 33f outside the fragile portion 33d, but is not bonded thereto.

Hereinafter, action of the secondary battery 100 of the embodiment will be described.

As described above, the secondary battery 100 of the embodiment has the current cut-off mechanism 50 provided in the current path between the external terminal 20A and the positive electrode 41 inside the battery container 10 being accommodated in the battery container 10, and is provided with the diaphragm 5 connected to the external terminal 20A and the current collector 30A connected to the positive electrode 41. In addition, the surface of the diaphragm 5 facing the inner side of the battery container 10 faces the internal space of the battery container 10, and the space of the diaphragm 5 on the outer side of the battery container 10 communicates with the external space of the battery container 10.

The secondary battery 100 of the embodiment stores power supplied via the external terminals 20A and 20B in the electrode group 40 at the normal time using current flowing in the current path including the current cut-off mechanism 50 on the basis of the above-described configuration. In addition, the secondary battery 100 supplies the power stored in the electrode group 40 to an external device via the external terminals 20A and 20B using the current flowing in the current path including the current cut-off mechanism 50.

For example, when the gas pressure inside the battery container 10 rises due to a breakage or the like caused by overcharge, an excessive temperature rise of the secondary battery 100 or an external force, a pressure applied to the surface of the diaphragm 5 facing the inner side of the battery container 10 is larger than a pressure applied to the surface facing the outer side of the battery container 10. Further, when the gas pressure inside the battery container 10 reaches a set pressure, the diaphragm 5 is deformed in a direction of being separated from the current collector 30A, and the fragile portion 33d of the current collector 30A is broken. To be more specific, the diaphragm 5 is plastically deformed to buckle toward the outer side of the battery container 10, and a force toward the outer side of the battery container 10 is applied to the bonding portion 33g of the current collector 30A, which is bonded to the protruding portion 5d of the diaphragm 5 so that the fragile portion 33d is broken. Accordingly, the connection between the diaphragm 5 and the breaking unit 33 of the current collector 30A is cut off, and the current path between the external terminal 20A and the positive electrode 41 inside the battery container 10 is cut off.

Herein, the current collector 30A includes the concave portion 33b on a surface thereof opposing the diaphragm 5. In addition, the diaphragm 5 has the convex shape of which the center portion bulges than the circumferential portion toward the current collector 30A, and at least the part thereof is accommodated in the concave portion 33b and is bonded to the current collector 30A inside the concave portion 33b. In other words, the diaphragm 5 has the convex shape which is disposed on an outer side of the battery container 10 than the current collector 30A and faces the inside of the battery container 10. In addition, the breaking unit 33 of the current collector 30A includes the concave portion 33b on the surface facing the outer side of the battery container 10, and the diaphragm 5 is bonded inside the concave portion 33b.

Thus, it is possible to accommodate apart of the diaphragm 5 of the convex shape facing the inner side of the battery container 10 in the concave portion 33b of the breaking unit 33 of the current collector 30A, to suppress an increase in dimension in a height direction of the battery container 10 of the current cut-off mechanism 50, and to increase the protrusion amount of the diaphragm 5 toward the inner side of the battery container 10. Accordingly, it is possible to increase the deformation amount of the diaphragm 5, which is deformed toward the outer side of the battery container 10, more than in the related art in a limited space between the electrode group 40 inside the battery container 10 and the battery cover 11, to enlarge an interval between the deformed diaphragm 5 and the current collector 30A, and to more reliably perform the cut-off of the current path between the positive electrode 41 and the external terminal 20A.

In addition, since the diaphragm 5 has the convex shape facing the inside of the battery container 10, it is possible to improve a mechanical strength until the gas pressure inside the battery container 10 reaches the predetermined pressure as compared to a case in which the diaphragm 5 has a flat plate shape, and to prevent the malfunction of the diaphragm 5. In addition, since the diaphragm 5 is deformed to be inverted when the gas pressure inside the battery container 10 reaches the predetermined pressure, it is possible to improve the responsiveness of deformation with respect to the pressure.

In addition, since the diaphragm 5 has the shape of which the width direction of the battery container 10 is the long-side direction, it is possible to secure the area of the diaphragm 5 inside the flat battery container 10. Accordingly, it is possible to cause the diaphragm 5 to be easily and reliably deformed when the gas pressure inside the battery container 10 reaches the predetermined pressure, and to more reliably perform the cut-off of the current path between the positive electrode 41 and the external terminal 20A. In addition, since a portion along a short-side direction of the diaphragm 5 is formed in a curved shape, it is possible to cause the diaphragm 5 to be easily and reliably deformed, and to more reliably perform the cut-off of the current path between the positive electrode 41 and the external terminal 20A.

In addition, since the diaphragm 5 includes the protruding portion 5d, it is possible to cause a circumferential side wall of the protruding portion 5d to work as a rib, to improve the strength of the diaphragm 5, and to prevent the diaphragm 5 from being deformed due to the malfunction. In addition, since the bottom surface of the protruding portion 5d is in contact with the breaking unit 33 of the current collector 30A at the outside of the fragile portion 33d, the application of stress, generated by vibration, onto the fragile portion 33d is suppressed, and it is possible to prevent the fragile portion 33d from being unintentionally broken.

In addition, the concave portion 33b provided in the breaking unit 33 of the current collector 30A includes the inclined surface 33c along the convex shape of the diaphragm 5. Thus, it is possible to increase the thickness of the bottom wall 33e of the concave portion 33b from the bonding portion 33g of the concave portion 33b to which the diaphragm 5 is bonded toward the circumferential portion of the concave portion 33b, to improve the strength of the breaking unit 33 around the bonding portion 33g, and to reduce the electrical resistance. Accordingly, it becomes easy to cause the breaking unit 33 of the current collector 30A to be broken and to separate the diaphragm 5 from the current collector 30A, and it is possible to more reliably perform the cut-off of the current path between the positive electrode 41 and the external terminal 20A.

In addition, the concave portion 33b provided in the breaking unit 33 of the current collector 30A includes the fragile portion 33d which is broken when the diaphragm 5 is deformed toward the outer side of the battery container 10. Accordingly, it is possible to cause the breaking unit 33 to be easily broken in the fragile portion 33d when the diaphragm 5 is deformed toward the outer side of the battery container 10, and to more reliably perform the cut-off of the current path between the positive electrode 41 and the external terminal 20A.

In addition, the fragile portion 33d of the current collector 30A is provided using the notched portion 33h formed in the concave portion 33b of the breaking unit 33, and the diaphragm 5 is bonded to the bonding portion 33g surrounded by the fragile portion 33d. Accordingly, the fragile portion 33d is broken as the stress focuses on the notched portion 33h when the diaphragm 5 is deformed toward the outer side of the battery container 10, the bonding portion 33g is separated from the breaking unit 33, and the connection between the diaphragm 5 and the current collector 30A is cut off. Accordingly, it is possible to more easily and reliably perform the cut-off of the current path between the positive electrode 41 and the external terminal 20A when the diaphragm 5 is deformed toward the outer side of the battery container 10.

In addition, the external terminal 20A includes the through-hole 23A which allows the space of the diaphragm 5 on the outer side of the battery container 10 and the external space of the battery container 10 to communicate with each other. Accordingly, it is possible to cause a pressure difference between the pressure applied to the surface of the diaphragm 5 facing the inner side of the battery container 10 and the pressure applied to the surface on the outer side of the battery container 10 when the gas pressure inside the battery container 10 rises. Accordingly, it is possible to cause the diaphragm 5 to be easily and reliably deformed toward the outer side of the battery container 10, and to more easily and reliably perform the cut-off of the current path between the positive electrode 41 and the external terminal 20A.

In addition, the secondary battery 100 of the embodiment is provided with the conductive plate 6, to which the circumferential portion 5a of the diaphragm 5 is bonded, between the external terminal 20A and the diaphragm 5. Further, the external terminal 20A includes the connection portion 22A passing through the battery container 10 and the conductive plate 6. Further, the connection portion 22A includes the caulking portion 22d, which is enlarged in diameter on the surface 6c of the conductive plate 6 facing the inside of the battery container 10, and the through-hole 23A which communicates with the space between the conductive plate 6 and the diaphragm 5. Accordingly, the diaphragm 5 is disposed inside the battery container 10 to be electrically connected to the external terminal 20A, the surface of the diaphragm 5 facing the inner side of the battery container 10 faces the internal space of the battery container 10, and the space between the diaphragm 5 on the outer side of the battery container 10 and the conductive plate 6 communicates with the external space of the battery container 10. Accordingly, it is possible to cause the diaphragm 5 to be easily and reliably deformed toward the outer side of the battery container 10, and to more easily and reliably perform the cut-off of the current path between the positive electrode 41 and the external terminal 20A.

In addition, the insulating member 3A is disposed between each of the current collector 30A and the conductive plate 6, and the battery container 10 in the secondary battery 100 of the embodiment. Further, the thin portion 3*d* between the conductive plate 6 and the battery container 10 has the thickness thinner than the thickness of the thick portion 3*c* between the current collector 30A and the battery container 10 in the insulating member 3A. Accordingly, it is possible to secure the space between the conductive plate 6 and the breaking unit 33 of the current collector 30A, and to increase the protrusion amount of the diaphragm 5 toward the inner side of the battery container 10. Accordingly, it is possible to increase the deformation amount of the diaphragm 5 toward the outer side of the battery container 10, and to more easily and reliably perform the cut-off of the current path between the positive electrode 41 and the external terminal 20A.

In addition, the current collector 30A includes the base portion 31A fixed to the insulating member 3A and the breaking unit 33 connected to the base portion 31A via the coupling portion 34. Further, the breaking unit 33 is disposed on the inner side of the battery container 10 than the base portion 31A, and includes the concave portion 33*b* formed on the surface thereof facing the outer side of the battery container 10. Accordingly, it is possible to secure the space between the conductive plate 6 and the breaking unit 33 of the current collector 30A, and to increase the protrusion amount of the diaphragm 5 toward the inner side of the battery container 10. Accordingly, it is possible to increase the deformation amount of the diaphragm 5 toward the outer side of the battery container 10, and to more easily and reliably perform the cut-off of the current path between the positive electrode 41 and the external terminal 20A.

In addition, the conductive plate 6 includes the annular groove 6*b* with which the circumferential portion 5*a* of the diaphragm 5 is engaged. Accordingly, it is possible to reliably fix the circumferential portion 5*a* of the diaphragm 5 to the conductive plate 6, and to improve the air-tightness between the conductive plate 6 and the diaphragm 5. In addition, it is possible to increase the protrusion amount of the diaphragm 5, to increase the deformation amount toward the outer side of the battery container 10, and to more easily and reliably perform the cut-off of the current path between the positive electrode 41 and the external terminal 20A.

In addition, the diaphragm 5 is disposed between the external terminal 20A of the positive electrode and the current collector 30A, and is configured using the aluminum or the aluminum alloy. Thus, it is possible to reduce a mechanical strength of a material forming the diaphragm 5, and to cause the diaphragm 5 to be easily deformed as compared to the case of disposing a diaphragm, which is configured using copper or a copper alloy, between the external terminal 20A and the current collector 30A of the negative electrode. Accordingly, it is possible to more easily and reliably perform the cut-off of the current path between the positive electrode 41 and the external terminal 20A. Incidentally, it is also possible to provide the current cut-off mechanism 50 on the negative-electrode side.

In addition, when the gas pressure inside the battery container 10 further rises after the diaphragm 5 is deformed and the current path between the positive electrode 41 and the external terminal 20A is cut off by the current cut-off mechanism 50, the gas discharge valve 13 is cleaved to release the gas inside the battery container 10 to the outside. Accordingly, it is possible to secure the safety of the secondary battery 100.

As described above, it is possible to make the current cut-off mechanism 50 compact, to increase the deformation amount of the diaphragm 5 when the pressure inside the battery container 10 rises, to enlarge the interval between the deformed diaphragm 5 and the current collector 30A, and to more reliably perform the cut-off of the current path between the positive electrode 41 and the external terminal 20A according to the secondary battery 100 of the embodiment.

Although the embodiment of the present invention has been described in detail with reference to the drawings as above, a specific configuration is not limited to the embodiment, and design alterations or the like made in a scope not departing from a gist of the present invention is included in the present invention.

For example, the description has been given regarding a configuration in which the concave portion 33*b* provided in the breaking unit 33 of the current collector 30A includes the inclined surface 33*c* having a linear shape in the cross-sectional view in the above-described embodiment, but the configuration of the concave portion 33*b* is not limited to this configuration. Hereinafter, a description will be given regarding Modification Example 1 and Modification Example 2 of the concave portion 33*b* with reference to FIGS. 6 and 7.

Figure 6:
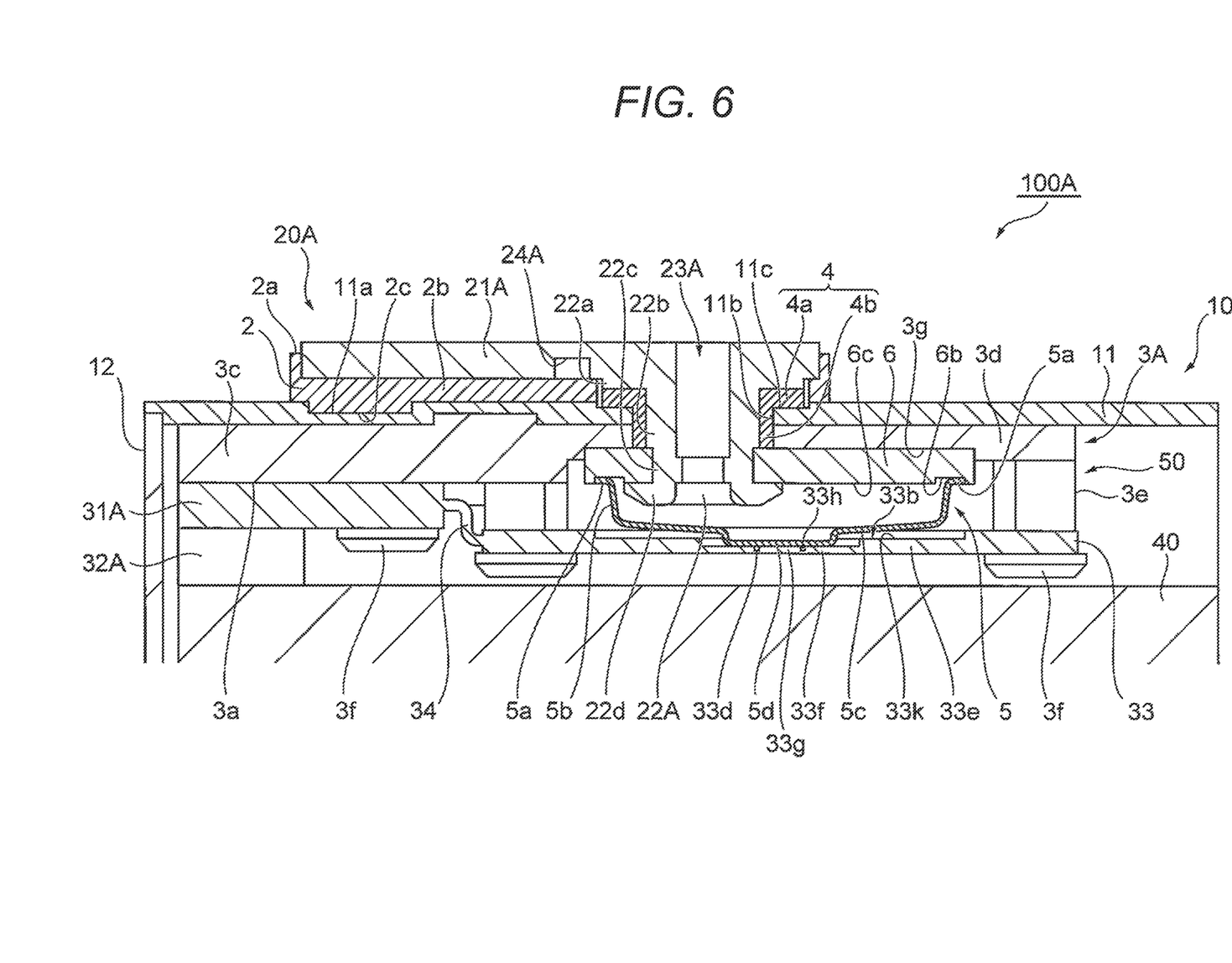
FIG. 6 is a cross-sectional view illustrating Modification Example 1 of the secondary battery illustrated in FIG. 4.
Figure 7:
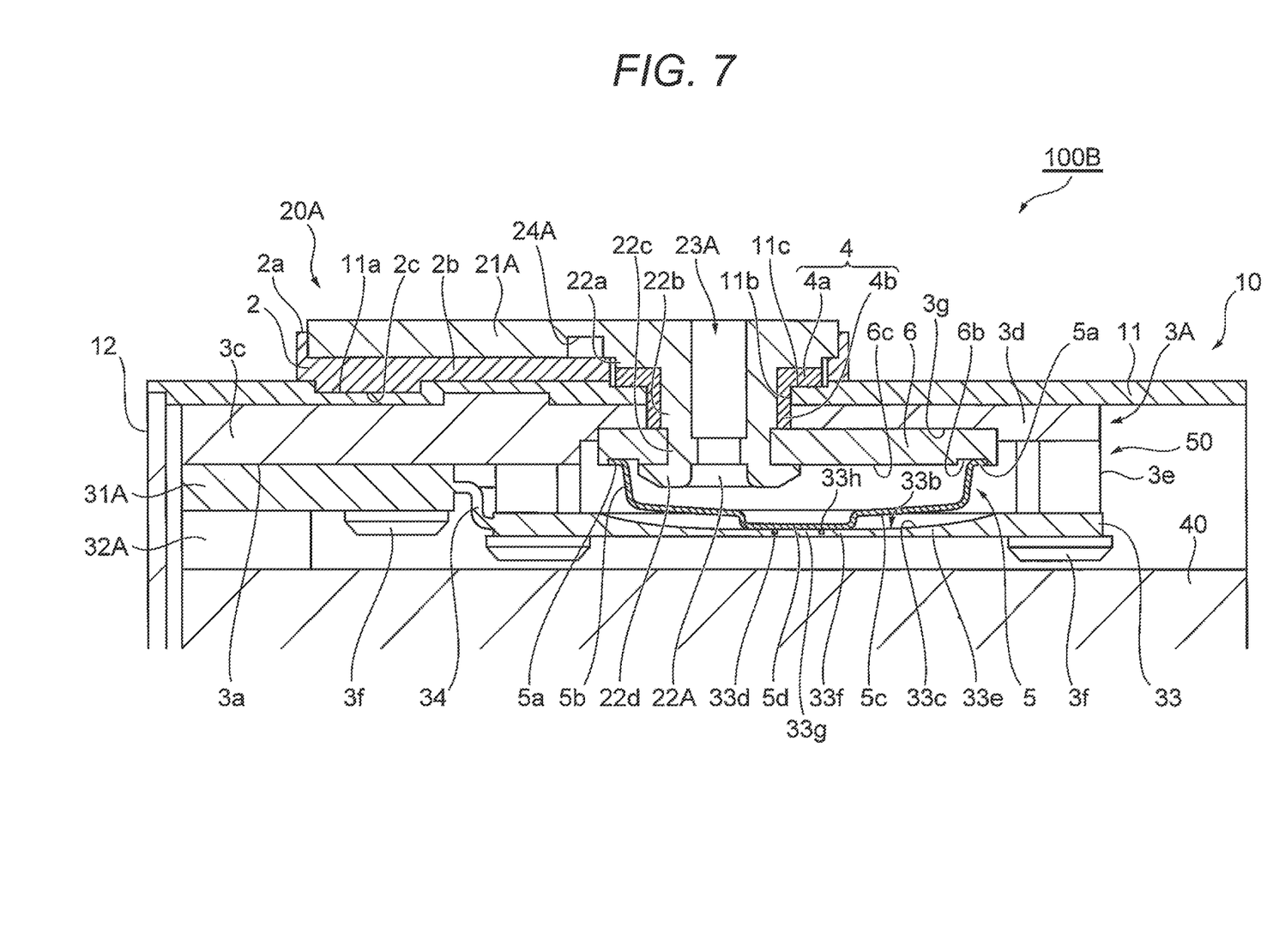
FIG. 7 is a cross-sectional view illustrating Modification Example 2 of the secondary battery illustrated in FIG. 4.

FIGS. 6 and 7 are cross-sectional views illustrating Modification Example 1 and Modification Example 2 of the secondary battery 100 of the above-described embodiment which corresponds to FIG. 4.

In a secondary battery 100A of Modification Example 1 illustrated in FIG. 6, the concave portion 33*b* includes a stepped portion 33*k* and gradually deepens from a circumferential portion thereof toward the bonding portion 33*g* to which the diaphragm 5 is bonded. In a secondary battery 100B of Modification Example 6 illustrated in FIG. 7, the inclined surface 33*c* of the concave portion 33*b* is formed as a concavely curved surface along a convexly curved surface of the bottom wall portion 5*c* of the diaphragm 5. The other points of the secondary batteries 100A and 100B of Modification Example 1 and Modification Example 2 are the same as those of the secondary battery 100 of the above-described embodiment, and the same part will be denoted by the same reference sign and will not be described.

Since the concave portion 33*b* includes the stepped portion 33*k* and gradually deepens from the circumferential portion thereof toward the bonding portion 33*g* to which the diaphragm 5 is bonded in the secondary battery 100A of Modification Example 1, it is possible to easily perform the pressing. Accordingly, it is possible to obtain the same effect as the secondary battery 100 of the above-described embodiment, to improve the productivity, and to reduce the manufacturing cost according to Modification Example 2.

Since the inclined surface 33*c* of the concave portion 33*b* is formed as the concavely curved surface along the convexly curved surface of the bottom wall portion 5*c* of the diaphragm 5 in the secondary battery 100B of Modification Example 2, it is possible to cause the thin portion 33*f* to be gradually thinner toward the bonding portion 33*g* and to be more easily broken at the time of deformation of the diaphragm 5. Accordingly, it is possible to obtain the same effect as the secondary battery 100 of the above-described embodiment, and to more reliably perform the cut-off of the current path between the positive electrode 41 and the external terminal 20A according to Modification Example 1.

Incidentally, the description has been given regarding a configuration in which the part of the diaphragm is accommodated in the concave portion of the current collector in the above-described embodiment and Modification Examples, but it may be configured such that the entire diaphragm is accommodated in the concave portion of the current collector in a case in which the current collector has a larger thickness than the protrusion amount of the diaphragm, for example.

REFERENCE SIGNS LIST 3A insulating member
3c thick portion
3d thin portion
5 diaphragm
5a circumferential portion
6 conductive plate
6b annular groove
10 battery container
11 battery cover (battery container)
12 battery case (battery container)
20A, 20B external terminal
22A connection portion
22d caulking portion
23A through-hole
30A, 30B current collector
31A base portion
33 breaking unit (current collector)
33b concave portion
33c inclined surface (concavely curved surface)
33d fragile portion
33g bonding portion
33h notched portion
33k stepped portion
41 positive electrode (electrode)
42 negative electrode (electrode)
50 current cut-off mechanism
100, 100A, 100B secondary battery

The invention claimed is:

1. A secondary battery comprising
a current cut-off mechanism provided in a current path between an external terminal and an electrode inside a battery container, wherein
the current cut-off mechanism is accommodated in the battery container, and includes a diaphragm connected to the external terminal and a current collector having a planar shape and being connected to the electrode,
the current collector defines a concave portion on a surface opposing the diaphragm which is formed in an elliptical shape, or oblong shape having curved portions at both ends of the straight portion having a width direction of the battery container as a long-side direction thereof, the shape of the current collector corresponding to the shape of the diaphragm when viewed in a plan view,
the diaphragm includes a circumferential portion, a side wall portion, a bottom wall portion, and a protruding portion from the outer side to the inner side of the battery container in a direction from a battery cover toward a bottom surface of a battery case,
at least a part of the bottom wall portion is accommodated in the concave portion, which includes a continuously inclined surface along the bottom wall portion of the diaphragm,
the protruding portion is bonded to the current collector inside the concave portion,
the current collector defines two flat surfaces connected by a coupling portion having at least two convex regions, and
the concave portion is formed on a lowest of the two flat surfaces.

2. The secondary battery according to claim 1, wherein the inclined surface includes a concavely curved surface along the bottom wall portion.

3. The secondary battery according to claim 1, wherein the concave portion includes a stepped portion, and gradually deepens from the circumferential portion toward a bonding portion to which the diaphragm is bonded.

4. The secondary battery according to claim 1, wherein the concave portion includes a fragile portion which is broken when the diaphragm is deformed in a direction separating from the current collector.

5. The secondary battery according to claim 4, wherein the fragile portion is provided using a notched portion formed in the concave portion, and the diaphragm is bonded to a bonding portion surrounded by the fragile portion.

6. The secondary battery according to claim 1, wherein the diaphragm is disposed closer to an outer side of the battery container than the current collector, and the external terminal includes a through-hole which allows, a space of the diaphragm on the outer side of the battery container and an external space of the battery container to communicate with each other.

7. The secondary battery according to claim 6, further comprising a conductive plate which is provided between the external terminal and the diaphragm and to which the circumferential portion of the diaphragm is bonded, wherein the external terminal includes a connection portion which passes through the battery container and the conductive plate, and the connection portion includes a caulking portion, which is enlarged in diameter on a surface of the conductive plate facing an inside of the battery container, and the through-hole communicating with a space between the conductive plate and the diaphragm.

8. The secondary battery according to claim 7, further comprising an insulating member which is disposed between each of the current collector and the conductive plate, and the battery container, wherein a thickness of a thin portion of the insulating member between the conductive plate and the battery container is thinner than a thickness of a thick portion thereof between the current collector and the battery container.

9. The secondary battery according to claim 8, wherein the current collector includes a base portion fixed to the insulating member and a breaking unit connected to the base portion via a coupling portion, and the breaking unit is disposed closer to an inner side of the battery container than the base portion, and includes the concave portion formed on a surface facing the outer side of the battery container, and the breaking unit is the lowest of the two flat surfaces.

10. The secondary battery according to claim 7, wherein the conductive plate includes an annular groove with which the circumferential portion (Sa) of the diaphragm is engaged.

11. The secondary battery according to claim 1, wherein the diaphragm is configured using aluminum or an aluminum alloy.

* * * * *